J. G. LANNOYE.
CONDIMENT SHAKER.
APPLICATION FILED OCT. 25, 1915.

1,246,618.

Patented Nov. 13, 1917.

Inventor
JOSEPH G. LANNOYE.

Witness
Ermene B. Wiener.

By
Charles E. Wiener
Attorney

UNITED STATES PATENT OFFICE.

JOSEPH G. LANNOYE, OF DETROIT, MICHIGAN.

CONDIMENT-SHAKER.

1,246,618.   Specification of Letters Patent.   Patented Nov. 13, 1917.

Application filed October 25, 1915. Serial No. 57,636.

*To all whom it may concern:*

Be it known that I, JOSEPH G. LANNOYE, a citizen of the United States, residing at Detroit, county of Wayne, State of Michigan, have invented a certain new and useful Improvement in Condiment-Shakers, and declare the following to be a full, clear, and exact description of the same, such as will enable others skilled in the art to which it pertains to make and use the same, reference being had to the accompanying drawings, which form a part of this specification.

This invention relates to salt cellars and the like, and its object is a cheap and efficient device formed of flexible material as rubber, whereby salt or other condiment that readily hardens may be broken up by simply kneading the shaker between the thumb and fingers of the user, or by rolling it upon a surface under pressure of the hand. A further object of the invention is a device of the character stated formed of a single piece of flexible rubber or the like having the discharge apertures at one end, a filling aperture at the opposite end, and a means for closing the apertures. These and other objects and novel features of the invention are hereinafter more fully described and claimed and shown in the accompanying drawings in which—

Similar characters refer to similar parts throughout the drawing and specification.

Figure 1:
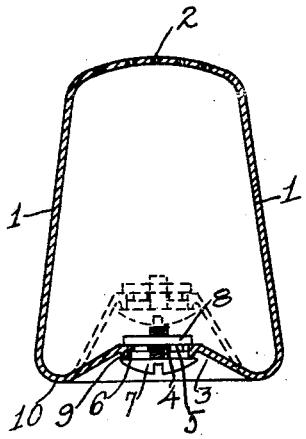
Figure 1 is a vertical section of a shaker embodying my invention.
Figure 2:
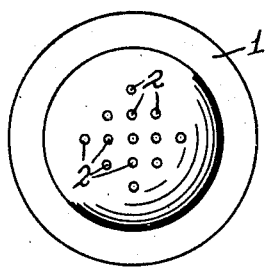
Fig. 2 is a plan view of the device showing the discharge openings.
Figure 3:
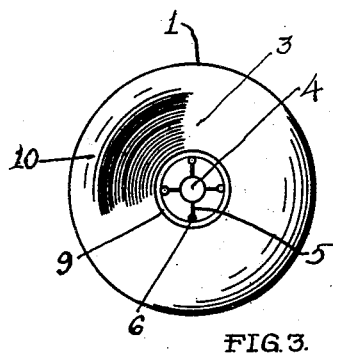
Fig. 3 is a view of the bottom thereof showing the filling aperture.

The preferred form of the device is shown in Fig. 1, but it is to be understood that the device may have as various forms as may be desired. As indicated in said Fig. 1, the device is formed of a single piece of flexible rubber 1, which is comparatively thin and pliable to allow the material to be kneaded and broken up to more readily discharge through the apertures 2 provided in the upper end thereof. The bottom or base of the shaker is concaved as indicated at 3 and is provided with a filling aperture 4 indicated in Fig. 3, and the surrounding material provided with a plurality of slits 5 running from the aperture 4 to small terminal apertures 6. The terminal apertures are provided to prevent tearing of the material and increasing the length of the slits by insertion of the plug or other cause. The preferred form of the plug is indicated in Fig. 1 and consists of a large headed screw 7, the threaded stem of which passes through the aperture 4 and the nut 8 into which the stem screws on the inside of the shaker. The nut 8 and the head 7 are of sufficient diameter to cover the openings 4 and 6. A ring shaped ridge or shoulder 9 is provided, slightly greater in diameter than any two opposite apertures 6 which ridge is engaged between the nut and the head of the screw as indicated in Fig. 1, which prevents the nut from becoming embedded in the material of the base and provides an effective closure for the apertures. By making the bottom concaved as indicated in Fig. 1, the head of the screw is held from engagement with the surface upon which the shaker may rest. The peripheral edge 10 of the bottom is preferably rounded as shown, being the only part contacting the surface on which the device stands.

Figure 4:
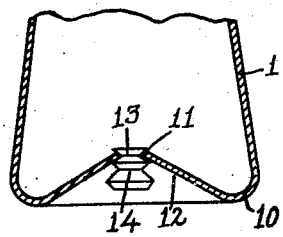
Fig. 4 is a detail of the bottom of the device in cross-section showing a peculiar form of the plug for closing the filling aperture.

An alternative form of the filling opening is indicated in Fig. 4 in which an aperture 11 is provided at the center of the concaved portion 12 and a plug preferably of rubber is provided having shoulders, and channels 13 and 14 of different diameters for closing the opening. When the device is new and the aperture 11 of its smallest general size the channel 13 of smaller diameter may form a proper closure for the aperture but from frequent use the aperture 11 may become slightly enlarged in which event the plug may be inserted in the aperture until the edges thereof engage the channel 14 of slightly greater diameter to properly fill the enlarged opening.

The device being formed entirely of flexible material, the caked condiment in the device may be readily kneaded between the thumb and fingers of the user as heretofore stated, and the plugs 7 and 13 also of hard material or hard rubber do not interfere with the kneading operation as the said plugs are supported by flexible material and may be readily moved about in kneading operation. For this reason the bottom of the chamber may be made deeper so that the plug is more nearly in the center of the shaker as indicated by dotted lines in Fig. 1. By this means the plug may be readily moved from one side to the other of the shaker and assist in the breaking up of material during the kneading operation.

The device may be formed in any desired manner but is preferably made in a mold of the proper form. The material in its green state, if formed of rubber is shaped by hand similar to the desired form and a little ammonia or other volatile fluid placed in the interior thereof. The formed piece is placed in the mold and the mold subjected to the proper degree of heat to cure the rubber. This subjection to heat volatilizes the fluid and the pressure of the resulting gas in the interior of the material forces the same into all parts of the mold alike so that the finished piece will have the exact form and configuration of the interior of the mold. The discharge apertures 2 may then be formed in any approved manner as by a lathe as is commonly done with receptacles of like nature.

As before stated the shaker may be formed of any desired material but is preferably formed of rubber of such composition as to prevent oxidizing which composition of treatment is well known to manufacturers of rubber articles, and the rubber is also of such composition as to be flexible and readily yield under the hand of the operator and yet of sufficient stiffness to normally hold its shape. If desired the filling opening instead of being formed in the bottom may be formed in the center of the top.

By forming the device of flexible material, the ordinary handling of the shaker tends to keep the condiment therein from caking, and the flexibility also enables the condiment to be readily discharged through the openings by mere manipulation or kneading of the device without the necessity of shaking. If the device be formed of rubber, it is preferably of a non-porous character preventing moisture being absorbed by the condiment through the wall of the device.

Having thus briefly described my invention, what I claim and desire to secure by Letters Patent of the United States is—

1. A condiment shaker formed of a single piece of flexible material molded to form, the material being apertured at the upper end to provide discharge openings and the lower end being formed to extend upward into the interior of the body and provided with a closable opening, the shaker being collapsible throughout the entire surface thereof.

2. As a new article of manufacture, a condiment shaker formed of a single piece of flexible rubber molded to shape, said rubber having discharge openings formed in the upper end thereof, and a closable opening at the bottom providing a shaker collapsible throughout the entire surface thereof.

3. As a new article of manufacture, a condiment shaker formed of a single piece of flexible rubber of a composition adapted to prevent oxidization, the said rubber having perforations for the discharge of condiment, and being formed with a reëntrant portion provided with a filling opening, and a closure for said opening.

4. In a condiment shaker, a body formed of a single piece of flexible rubber of a character to retain its form without additional support, said body having perforations formed in the end thereof for the discharge of the condiment, and a reëntrant portion formed at the opposite end provided with a filling opening, an annular ridge formed about the said opening, and a closure for the opening adapted to blindingly engage the ridge.

5. A condiment shaker comprising a body formed of a single piece of flexible rubber having perforations for the discharge of condiment and a filling opening, said filling opening being formed of a central aperture and a plurality of smaller apertures surrounding and spaced from said central aperture, and slits extending from the said central aperture to each of the surrounding apertures, and a plug for said opening having a head adapted to cover all of the said apertures.

6. A condiment shaker comprising a body formed of a single piece of flexible rubber having perforations for the discharge of condiment and a filling opening, said filling opening being formed of a central aperture and a plurality of smaller apertures surrounding and spaced from said central aperture, and a slit extending from the said central aperture to each of the surrounding apertures, a ridge formed in the material surrounding the group of apertures, and a screw plug for closing said filling opening having a stem adapted to extend through the said central aperture, and a nut and a head between which said ridge engages.

In testimony whereof, I sign this specification.

JOSEPH G. LANNOYE.